March 4, 1969   E. Q. SMITH, JR   3,430,445
COMBINED ROCKET-RAMJET AIRCRAFT
Filed Oct. 30, 1962

INVENTOR.
E. QUIMBY SMITH JR.

BY *Howard J. Murray* AGENT
*George J. Rubens*
ATTORNEY

United States Patent Office 3,430,445
Patented Mar. 4, 1969

3,430,445
COMBINED ROCKET-RAMJET AIRCRAFT
E. Quimby Smith, Jr., Oxnard, Calif., assignor to the United States of America as represented by the Secretary of the Navy
Continuation-in-part of application Ser. No. 11,934, Feb. 29, 1960. This application Oct. 30, 1962, Ser. No. 234,585
U.S. Cl. 60—245     1 Claim
Int. Cl. F02k 9/04

The invention described herein may be manufactured and used by or for the Government of the United States of America for governmental purposes without the payment of any royalties thereon or therefor.

The present application constitutes a continuation-in-part of application Ser. No. 11,934, filed Feb. 29, 1960 and now abandoned.

This invention relates to solid-propellant ramjet missiles employing booster motors, and more particularly to such a missile in which a common combustion chamber is provided for both the ramjet and booster propulsion systems.

The merits of ramjet propulsion systems are well known. However, attainment of optimum operating conditions for a missile employing this type of propulsion system requires a separate booster system to rapidly propel the missile up to the operating speed of the ramjet system, which may exceed Mach 3. Such booster systems frequently rely upon one or more separate rocket booster motors detachably mounted to the exterior of the missile. This results in excessive weight and size over optimum design, and creates personnel and equipment hazard from the falling booster motor upon separation from the missile.

These problems are avoided in the present invention by incorporating the booster system as an integral part of the ramjet system within the missile in such a manner that a common combustion area is provided. In a preferred embodiment, the sustainer and booster systems are mounted adjacently within the missile casing and longitudinally disposed in that order between the ram-air inlet and the aft nozzle opening, the ramjet motor having a tubular configuration and the rocket motor being cylindrical in shape. For more efficient operation in both the boost phase and the sustainer phase in missile flight, the missile is provided with a nozzle formed with a consumable throat portion presenting two different size exhaust openings, each opening being utilized during the operation of the respective motor system.

A principal object of the present invention is to provide a missile having both an internally-housed booster motor system and a ramjet propulsion system, each motor incorporating a solid propellant which is solely end-burning in nature.

A further object of the invention is to provide a combined rocket-ramjet missile wherein complete consumption of the rocket motor fuel occurs before initiation of the ramjet phase of missile flight.

Still another object of the invention is to provide a single nozzle for a combined rocket-ramjet missile adaptable for use in sequence with both propulsion systems.

Other objects and many of the attendant advantages of this invention will be readily appreciated as the same becomes better understood by reference to the following detailed description when considered in connection with the accompanying drawings, wherein.

Figure 1:
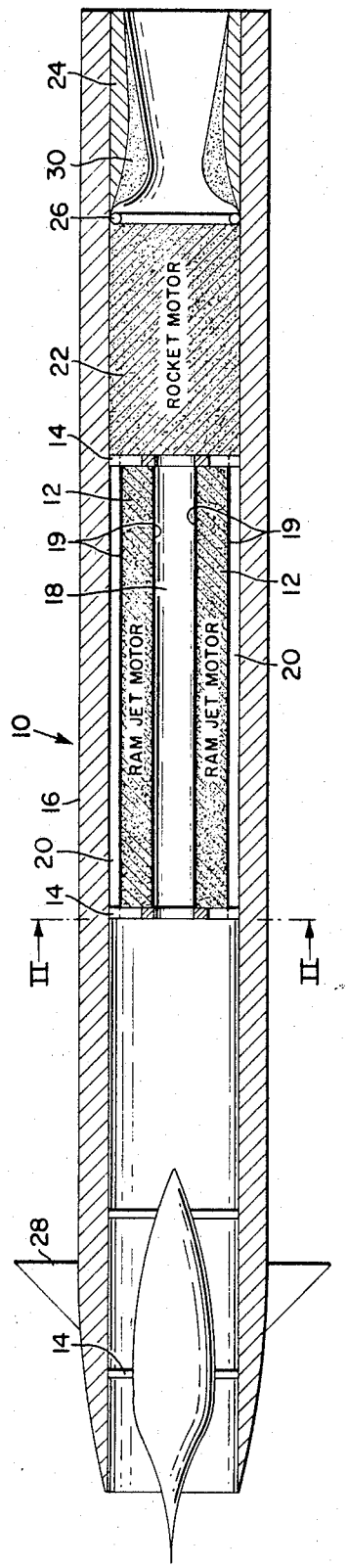
FIG. 1 is a sectional view of a combined rocket-ramjet missile wherein solid propellant ramjet and rocket booster motors are longitudinally disposed within the missiles.
Figure 3:
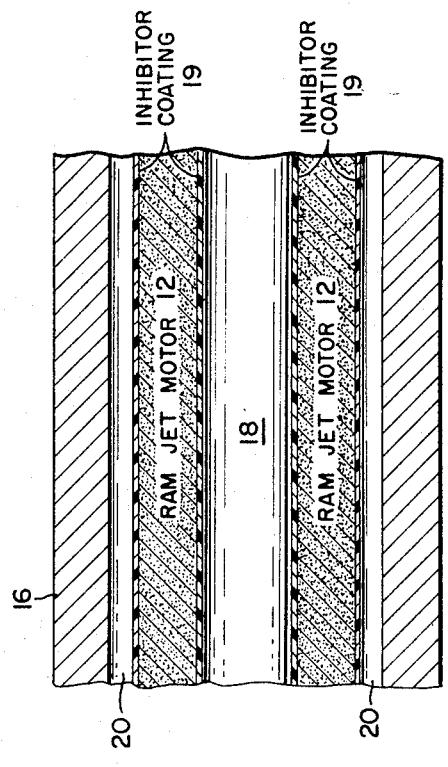
FIG. 3 is an enlarged view of a portion of FIG. 1 more clearly showing the inhibitor coatings on the ramjet propellant.
Figure 2:
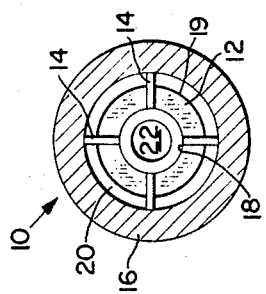
FIG. 2 is a cross-section taken along line II—II of FIG. 1.

Referring now to the drawings wherein like reference characters designate corresponding parts throughout the views, there is shown a combined rocket-ramjet missile 10 having a solid propellant ramjet motor. In missile 10, the ramjet sustainer motor employs a tubular solid-propellant substance 12 supported at each end by spaced radial stringers 14 (FIG. 2) within a tubular casing 16, the propellant grain having a longitudinal core opening 18 extending therethrough forming a first ram air passage. The stringers 14 are preferably embedded directly into the propellant material. An open annular space 20 is provided around the periphery of the solid propellant grain to provide a second ram-air passage. The solid propellant 12 is intended to be solely end-burning, and to preclude any radial burning the surfaces thereof are provided with an inhibitor coating 19. Accordingly, ram air entering the missile nose has two available paths—namely, core 18 and annular space 20, and the reason for the solely end-burning characteristic of the ramjet propellant will now be apparent—it prevents the creation of an excessive pressure in the combustion chamber which would result if the air paths 18 and 20 were to become enlarged during ramjet operation. The possibility of ramjet engine flame-out is thus avoided.

A rocket booster motor also consisting of a solid propellant substance 22 having a cylindrical configuration is case-bonded or otherwise secured along its periphery to the inner surface of casing 16 longitudinally extending between the ramjet motor 12 and a consumable nozzle 24, the forward wall of the rocket fuel initially blocking both ram-air passages 18 and 20, and being either closely adjacent to or directly contacting the ramjet propellant. The outer diameter of the rocket propellant is substantially identical to the inner diameter of the casing 16 so that no gap exists therebetween.

The aft wall of the rocket propellant can be ignited by a ring-shaped squib 26. When ignited, the rocket propellant burns until consumed, unblocking ram-air passages 18 and 20, and simultaneously igniting the ramjet propellant. The burned-out rocket propellant motor space accordingly serves as a combustion area during ramjet operation. The rocket fuel may be utilized to initiate burning of the ramjet fuel at their point of contact as heretofore described, or a conventional ignitor (not shown) may be employed. It will be noted that a ram air flow control means is not required, because the solid rocket fuel prevents any flow of ram air until the ramjet motor is ready for operation. A conventional Canard type of steering mechanism 28 is illustrated, although forming no part of the invention.

Shortly after ignition of the ramjet propellant 12, the forward-burning action thereof will result in the rear stringer 14 is no longer being effective as a support for the propellant. However, the foremost one of the stringers 14 alone will suffice to retain the solely end-burning ramjet propellant in position, especially since the two stringers 14 are preferably embedded in or otherwise securely associated with the fuel. The feasibility of mounting a ramjet propellant material at but one of its two longitudinal extremities is brought out in a copending U.S. patent application of Frederick L. Haake, Ser. No. 206,545, filed June 26, 1962.

This invention combines a rocket booster motor and ramjet sustainer motor within the missile enabling the use of a common combustion chamber. It naturally follows that this combination can advantageously utilize the common nozzle 24. However, as the booster and sustainer motors normally operate at different pressures, different size nozzle throats are desirable to attain maximum operating efficiency. This result can be achieved by constricting the nozzle with a consumable throat portion 30 which is burned out during operation of the rocket motor in the boost phase, and presenting an enlarged counterpart nozzle throat portion for the ramjet motor operation.

This invention provides a combined rocket ramjet aircraft particularly suitable for guided missiles wherein the rocket booster motor and ramjet sustainer motor are disposed within the confines of the missile as an integral part thereof. This construction eliminates external rocket motors and the inherent problems of separation. The two motors are so interrelated that the rocket motor region forms a combustion area for jet motor operation and the presence or absence of the rocket motor propellant controls the passage of ram air for the operation of the ramjet motor. Obviously, the relative dimensions of the motors will depend on various factors, such as missile range, etc.

Many modifications and variations of the present invention are possible in the light of the above teachings. It is therefore to be understood that within the scope of the appended claim the invention may be practiced otherwise than as specifically described.

I claim:
1. A combined rocket-ramjet aircraft comprising:
 (a) an outer tubular casing having a forward opening to atmosphere providing a ram air inlet and having an aft opening connected to a nozzle providing an exhaust outlet;
 (b) a ramjet sustainer motor and a rocket booster motor mounted adjacently within the casing and longitudinally disposed in that order between the inlet and outlet;
 (c) the ramjet motor having a tubular configuration so as to define an axial air passage therein and being of smaller outer diameter than the inner diameter of said casing so as to define an annular air passage therebetween;
 (d) the rocket motor and the ramjet motor each comprising a solely end-burning solid propellant, with the rocket propellant having a cylindrical configuration and being of the same outer diameter as the inner diameter of said casing so as to completely fill said casing in a radial direction;
 (e) said rocket propellant thus directly contacting the inner surface of said casing so as to close the annular air passage formed between the outer surface of the tubular ramjet motor and the inner surface of said casing until such time as the rocket motor propellant has been consumed during operation of said aircraft;
 (f) said rocket motor being so arranged within said casing as to occupy a region which becomes a combustion chamber for the ramjet motor when said rocket propellant has been consumed;
 (g) the casing thus acting to preclude any burning other than end-burning of said rocket motor propellant; and
 (h) an inhibitor coating on those surfaces of said tubular ramjet motor propellant which define said ram air passages;
 (i) said coating acting to preclude any burning other than end-burning of said ramjet propellant and thus prevent any radial enlargement of either or both of the axial and annular air passages in said ramjet motor, such enlargement, when allowed to occur, tending to produce excessive air pressure in said combustion chamber after said rocket propellant has been consumed to correspondingly increase the possibility of ramjet engine flame-out.

References Cited
UNITED STATES PATENTS

| | | | |
|---|---|---|---|
| 2,799,987 | 7/1957 | Chandler | 60—35.6 |
| 2,912,820 | 11/1959 | Whitmore | 60—35.6 |

SAMUEL FEINBERG, *Primary Examiner.*

U.S. Cl. X.R.

60—250; 251, 270